United States Patent
Iwasa

(10) Patent No.: US 9,720,475 B2
(45) Date of Patent: Aug. 1, 2017

(54) INFORMATION PROCESSING SYSTEM, INFORMATION PROCESSING DEVICE, AND INFORMATION PROCESSING METHOD

(71) Applicant: Keisuke Iwasa, Kanagawa (JP)

(72) Inventor: Keisuke Iwasa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 222 days.

(21) Appl. No.: 14/467,568

(22) Filed: Aug. 25, 2014

(65) Prior Publication Data

US 2015/0067375 A1 Mar. 5, 2015

(30) Foreign Application Priority Data

Sep. 4, 2013 (JP) .................................. 2013-183414
May 21, 2014 (JP) .................................. 2014-105644

(51) Int. Cl.
  *G06F 1/30* (2006.01)
  *G06F 1/26* (2006.01)

(52) U.S. Cl.
  CPC ........ *G06F 1/266* (2013.01); *G06F 2200/261* (2013.01)

(58) Field of Classification Search
  None
  See application file for complete search history.

(56) References Cited

U.S. PATENT DOCUMENTS

| | | | | |
|---|---|---|---|---|
| 6,304,981 | B1 * | 10/2001 | Spears | G06F 11/004 714/22 |
| 2012/0173911 | A1 * | 7/2012 | Cerwinski | G06F 1/3203 713/340 |
| 2012/0279839 | A1 * | 11/2012 | Iwata | H01H 47/002 200/308 |

FOREIGN PATENT DOCUMENTS

| JP | 2010-213367 A | 9/2010 |
|---|---|---|
| JP | 2014-056315 A | 3/2014 |

* cited by examiner

*Primary Examiner* — Paul Yanchus, III
(74) *Attorney, Agent, or Firm* — Oblon, McClelland, Maier & Neustadt, L.L.P.

(57) ABSTRACT

An information processing system includes a receiving unit that receives user operation; a setting unit that holds association information in which pieces of necessity information each indicating necessity of a shutdown process indicating a process required for stopping power supply to a corresponding device are associated with a plurality of devices, respectively; a first instruction unit that instructs a target device for which the power supply is to be stopped to perform the shutdown process when the receiving unit receives operation to stop the power supply and the target device requires the shutdown process based on the association information; and a second instruction unit that instructs a power supply control device that controls execution or stop of the power supply to the target device to stop the power supply to the target device when the shutdown process of the target device is completed.

7 Claims, 10 Drawing Sheets

FIG.5

| OBTAIN NEWEST | OUTLET #1 | OUTLET #2 | OUTLET #3 | OUTLET #4 |
|---|---|---|---|---|
| POWER-STRIP #1 | ON | ON | ON | OFF |
| POWER-STRIP #2 | ON | ON | ON | ON |
| POWER-STRIP #3 | OFF | OFF | OFF | OFF |
| POWER-STRIP #4 | ON | ON | ON | ON |
| POWER-STRIP #5 | OFF | OFF | ON | ON |

FIG.6

| OBTAIN NEWEST | OUTLET #1 | OUTLET #2 | OUTLET #3 | OUTLET #4 |
|---|---|---|---|---|
| POWER-STRIP #1 | 100 W | 20 W | 300 W | 0 W |
| POWER-STRIP #2 | 50 W | 300 W | 100 W | 500 W |
| POWER-STRIP #3 | 0 W | 0 W | 0 W | 0 W |
| POWER-STRIP #4 | 300 W | 100 W | 100 W | 500 W |
| POWER-STRIP #5 | 0 W | 0 W | 100 W | 50 W |

ASSOCIATION INFORMATION
CORRESPONDING TO POWER-STRIP #1

| OUTLET | NECESSITY INFORMATION | SHUT DOWN METHOD |
|---|---|---|
| #1 | NECESSARY | REMOTE SHUT DOWN COMMAND |
| #2 | NOT NECESSARY | – |
| #3 | NOT NECESSARY | – |
| #4 | NECESSARY | USE WebAPI |
| #5 | NECESSARY | NOTIFY OF SHUT DOWN BY WiFi DIRECT |

| OBTAIN NEWEST | OUTLET #1 | OUTLET #2 | OUTLET #3 | OUTLET #4 |
|---|---|---|---|---|
| POWER-STRIP #1 | ON | ON | ON | OFF |
| POWER-STRIP #2 | ON | ON | ON | ON |
| POWER-STRIP #3 | OFF | ON→OFF Now Shutdown... | OFF | OFF |
| POWER-STRIP #4 | ON | ON | ON | ON |
| POWER-STRIP #5 | OFF | OFF | ON | ON |

INFORMATION PROCESSING SYSTEM, INFORMATION PROCESSING DEVICE, AND INFORMATION PROCESSING METHOD

CROSS-REFERENCE TO RELATED APPLICATIONS

The present application claims priority to and incorporates by reference the entire contents of Japanese Patent Application No. 2013-183414 filed in Japan on Sep. 4, 2013 and Japanese Patent Application No. 2014-105644 filed in Japan on May 21, 2014.

BACKGROUND OF THE INVENTION

1. Field of the Invention

The present invention relates to an information processing system, an information processing device, and an information processing method.

2. Description of the Related Art

Technology of managing power of various devices is conventionally known. For example, Japanese Laid-open Patent Publication No. 2010-213367 discloses technology in which, when there is a command to stop power supply to an electric device (sometimes simply referred to as a "device" in the following description) from a remote controller in order to manage the power, a power supplying device (for example, an intelligent power strip) stops the power supply to the device.

However, in the above-described conventional technology, even a device which requires a shutdown process indicating a process required for stopping the power supply to the device immediately stops the power supply without performing the shutdown process when the command to stop the power supply to the device is issued from the remote controller, so that this might cause failure of the device.

Therefore, there is a need to provide an information processing system, an information processing device, and an information processing method capable of preventing immediate stop of the power supply without performing the shutdown process when the power supply to the device which requires the shutdown process is stopped.

SUMMARY OF THE INVENTION

It is an object of the present invention to at least partially solve the problems in the conventional technology.

According to an embodiment, there is provided an information processing system that includes a receiving unit that receives user operation; a setting unit that holds association information in which pieces of necessity information each indicating necessity of a shutdown process indicating a process required for stopping power supply to a corresponding device are associated with a plurality of devices, respectively; a first instruction unit that instructs a target device for which the power supply is to be stopped to perform the shutdown process when the receiving unit receives operation to stop the power supply and the target device requires the shutdown process based on the association information; and a second instruction unit that instructs a power supply control device that controls execution or stop of the power supply to the target device to stop the power supply to the target device when the shutdown process of the target device is completed.

According to another embodiment, there is provided an information processing device that includes a receiving unit that receives user operation; a setting unit that holds association information in which pieces of necessity information each indicating necessity of a shutdown process indicating a process required for stopping power supply to a corresponding device are associated with a plurality of devices, respectively; a first instruction unit that instructs a target device for which the power supply is to be stopped to perform the shutdown process when the receiving unit receives operation to stop the power supply and the target device requires the shutdown process based on the association information; and a second instruction unit that instructs a power supply control device that controls execution or stop of the power supply to the target device to stop the power supply to the target device when the shutdown process of the target device is complete.

According to still another embodiment, there is provided an information processing method that includes receiving user operation; instructing a target device for which power supply is to be stopped to perform a shutdown process when operation to stop the power supply is received and the target device requires the shutdown process based on association information in which pieces of necessity information each indicating necessity of the shutdown process indicating a process required for stopping the power supply to a corresponding device are associated with a plurality of devices, respectively; and instructing a power supply control device that controls execution or stop of the power supply to the target device to stop the power supply to the target device when the shutdown process of the target device is complete.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a view of a display screen example for giving an instruction to turn on or off a power supply;

FIG. 6 is a view of a display screen example of an instantaneous power consumption status;

DETAILED DESCRIPTION OF THE PREFERRED EMBODIMENTS

Exemplary embodiments according to the present invention will be described in detail below with reference to the attached drawings.

First Embodiment

Figure 1:
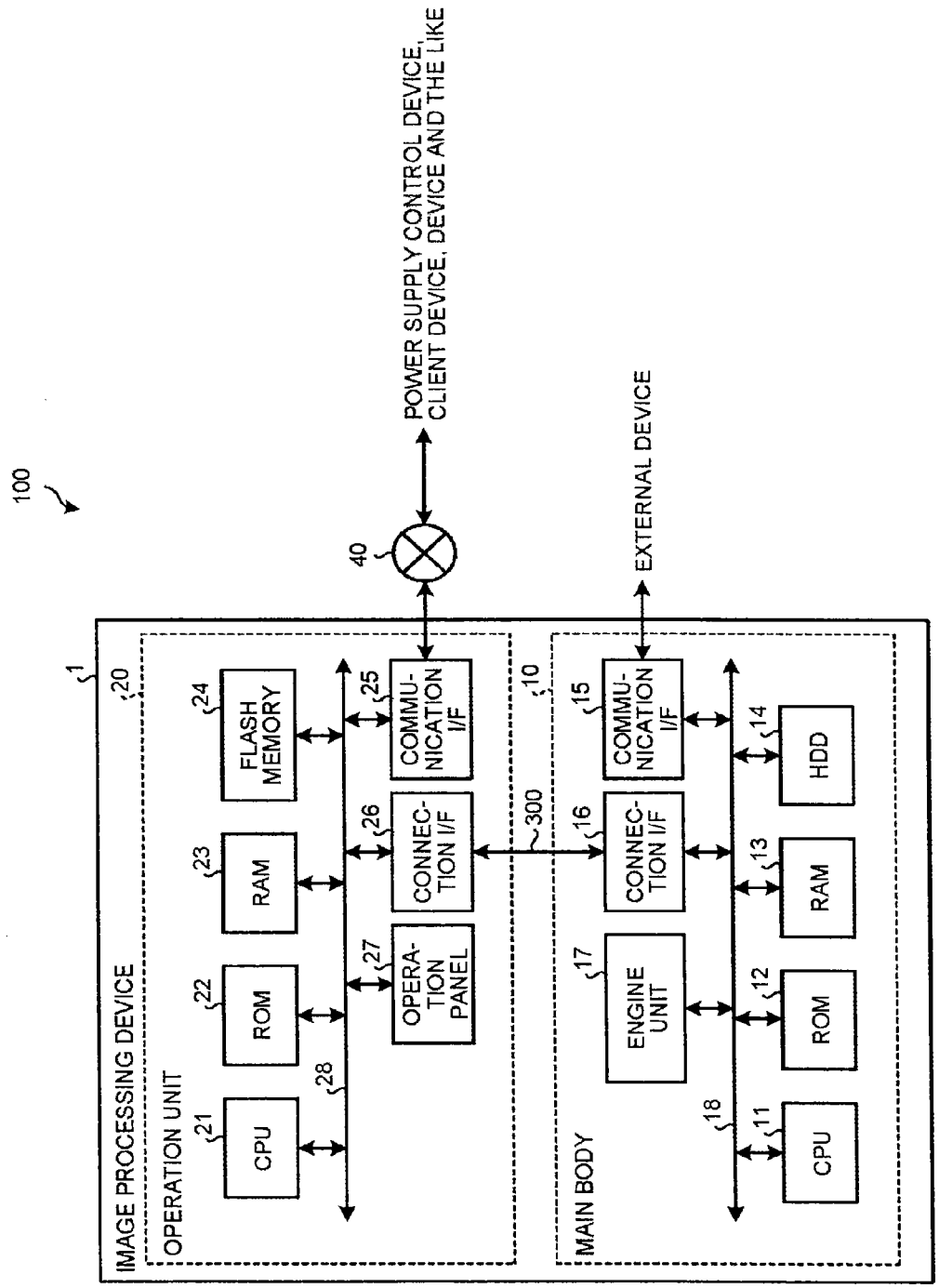
FIG. 1 is a view of a hardware configuration example of an information processing system.

A hardware configuration of an information processing system is first described with reference to FIG. 1. FIG. 1 is a block diagram of an example of the hardware configuration of the information processing system of a first embodiment.

As illustrated in FIG. 1, an information processing system 100 includes an image processing device 1, a power supply control device and the like. The image processing device 1 is connected to the power supply control device and a client device through a network 40 such as a LAN (local area network) and the Internet.

The image processing device 1 includes a main body 10 capable of realizing various functions such as a printer function, a copy function, a scanner function, and a facsimile function and an operation unit 20 which accepts an input according to user operation. The main body 10 and the operation unit 20 are connected so as to be able to communicate with each other through a dedicated communication path 300. Although a USB (universal serial bus) standard may be used, for example, as the communication path 300, a wired or wireless optional standard may also be used.

The main body 10 performs operation according to the input accepted by the operation unit 20. The main body 10 may communicate with an optional external device and may perform operation according to an instruction received from the external device.

The main body 10 includes a CPU 11, a ROM 12, a RAM 13, an HDD (hard disk drive) 14, a communication I/F (interface) 15, a connection I/F 16, and an engine unit 17 connected to a system bus 18.

The CPU 11 generally controls the operation of the main body 10. The CPU 11 controls the operation of an entire main body 10 by executing a program stored in the ROM 12, the HDD 14 or the like by using the RAM 13 as a work area (work area). The CPU 11 realizes the above-described various functions such as the printer function, the copy function, the scanner function, and the facsimile function.

The communication I/F 15 is the interface for communicating with the external device. The connection I/F 16 is the interface for communicating with the operation unit 20 through the communication path 300.

The engine unit 17 is hardware which executes versatile information processing and a process other than communication for realizing the printer function, the copy function, the scanner function, the facsimile function and the like. For example, the engine unit 17 includes a scanner which scans a document to read, a plotter which prints on a sheet material such as paper, a facsimile unit which performs facsimile communication and the like. Furthermore, the engine unit 17 may also include a specific option such as a finisher which sorts printed sheet materials and an ADF (automatic document feeder) which automatically feeds the document.

The operation unit 20 includes a CPU 21, a ROM 22, a RAM 23, a flash memory 24, a communication I/F 25, a connection I/F 26, and an operation panel 27 connected to a system bus 28.

The CPU 21 generally controls operation of the operation unit 20. The CPU 21 controls the operation of an entire operation unit 20 by executing a program stored in the ROM 22, the flash memory 24 or the like by using the RAM 23 as a work area (work area). The CPU 21 realizes various functions such as to display information (image) according to the input accepted by the user operation.

The communication I/F 25 is the interface for communicating with the power supply control device, the client device, a device and the like through the network 40. The connection I/F 26 is the interface for communicating with the main body 10 through the communication path 300.

The operation panel 27 accepts various inputs according to the user operation and displays various pieces of information. For example, the various pieces of information include information according to the accepted input, information indicating an operation status of the image processing device 1, information indicating a setting state and the like. In this embodiment, the operation panel 27 is formed of an LCD (liquid crystal display) having a touch panel function, but the panel is not limited to this. For example, the operation panel 27 may be formed of an organic EL (electro luminescence) display having the touch panel function. Furthermore, it is also possible to provide an operation unit such as a hardware key and a display unit such as a lamp in addition to or in place of this.

Figure 2:
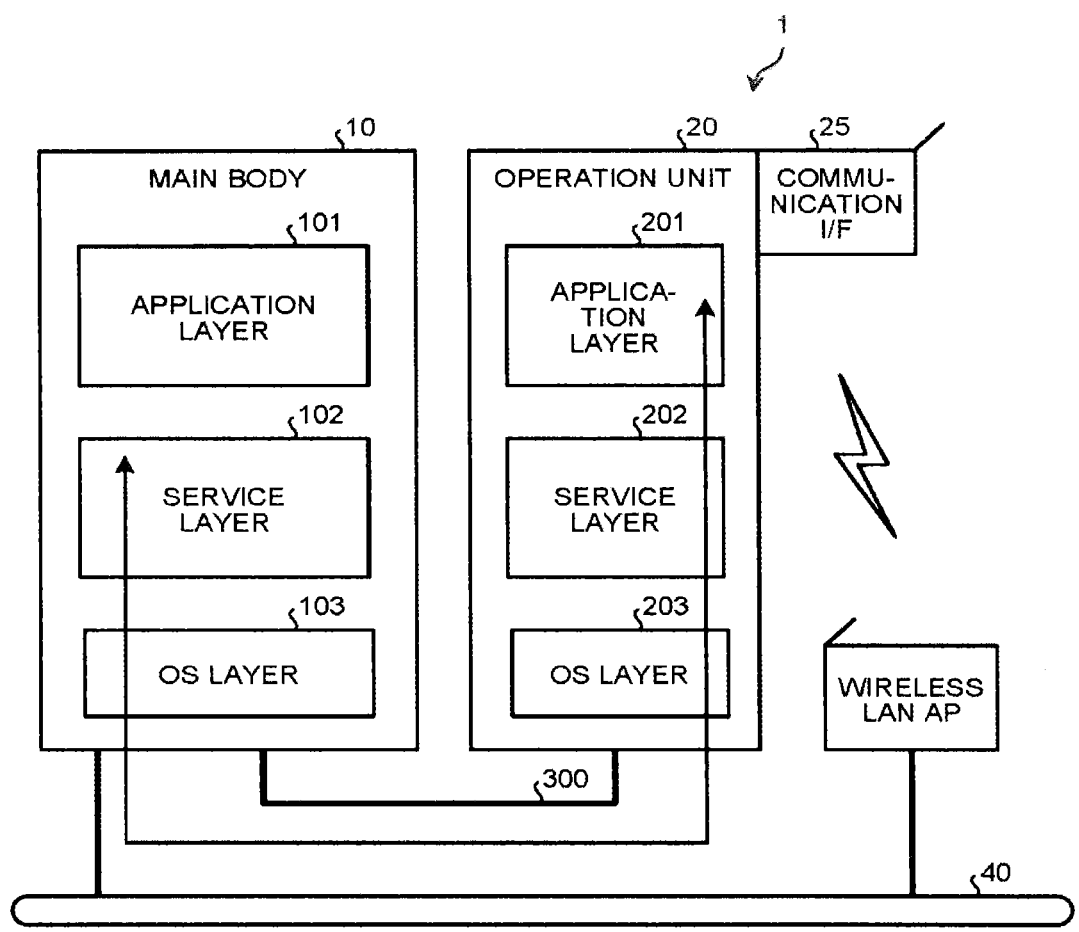
FIG. 2 is a schematic diagram of a software configuration example of an image processing device.

A software configuration of the image processing device 1 is next described with reference to FIG. 2. FIG. 2 is a schematic diagram of an example of the software configuration of the image processing device 1.

As illustrated in FIG. 2, the main body 10 includes an application layer 101, a service layer 102, and an OS (operating system) layer 103. Substances of the application layer 101, the service layer 102, and the OS layer 103 are various pieces of software stored in the ROM 12, the HDD 14 and the like. The CPU 11 executes the pieces of software to provide the various functions.

The software of the application layer 101 is application software for allowing hardware resources to operate to provide a predetermined function (hereinafter, sometimes referred to as "application"). For example, the application includes a copy application for providing the copy function, a scanner application for providing the scanner function, a facsimile application for providing the facsimile function, a printer application for providing the printer function and the like.

The software of the service layer 102 is the software interposed between the application layer 101 and the OS layer 103 for providing the application with an interface for using the hardware resources provided on the main body 10. More specifically, such software is the software for providing a function to accept an operation request to the hardware resources and to adjust the operation request. The operation request accepted by the service layer 102 includes a request to read by the scanner, print by the plotter and the like.

The function of the interface by the service layer 102 is provided not only to the application layer 101 of the main body 10 but also to an application layer 201 of the operation unit 20. That is to say, the application layer 201 of the operation unit 20 may also realize the function by using the hardware resources of the main body 10 (the engine unit 17 and the like, for example) through the interface function of the service layer 102.

The software of the OS layer 103 is basic software (operating system) for providing a basic function to control the hardware provided on the main body 10. The software of the service layer 102 converts a use request of the hardware resources from the various applications to a command interpretable by the OS layer 103 to pass to the OS layer 103.

The command is executed by the software of the OS layer 103, then the hardware resources perform the operation according to the request of the application.

The operation unit 20 includes the application layer 201, a service layer 202, and an OS layer 203. A hierarchical structure of the application layer 201, the service layer 202, and the OS layer 203 included in the operation unit 20 is similar to that of the main body 10. However, the function provided by an application of the application layer 201 and a type of the operation request which the service layer 202 may accept are different from those of the main body 10. The application of the application layer 201 is software for allowing the hardware resources provided on the operation unit 20 to operate to provide a predetermined function. The application of the application layer 201 includes software for providing a function of UI (user interface) for performing operation regarding the functions provided on the main body 10 (printer function, copy function, scanner function, and facsimile function) and displaying and software for providing a function to control a power supply of each device through the power supply control device (sometimes referred to as a "power management application" in the following description).

In this embodiment, a case in which the software of the OS layer 103 of the main body 10 and the software of the OS layer 203 of the operation unit 20 are different from each other is described as an example for maintaining independency of the functions. That is to say, the main body 10 and the operation unit 20 are operated independently of each other by different operating systems. For example, it is possible to adopt Linux (registered trademark) as the software of the OS layer 103 of the main body 10 and adopt Android (registered trademark) as the software of the OS layer 203 of the operation unit 20.

As described above, in the image processing device 1 according to this embodiment, the main body 10 and the operation unit 20 are operated by the different operating systems, so that the communication between the main body 10 and the operation unit 20 is performed not as inter-process communication in the same device but the communication between different devices. For example, operation to transmit the input (instruction contents by the user operation) accepted by the operation unit 20 to the main body 10 (command communication), operation that the main body 10 notifies the operation unit 20 of an event and the like are performed as the communication between the different devices. According to this, the operation unit 20 may use the function of the main body 10 by performing the command communication with the main body 10. Meanwhile, the event of which the operation unit 20 is notified by the main body 10 includes an execution status of the operation in the main body 10, the contents set by the main body 10 and the like.

In this embodiment, power supply to the operation unit 20 is performed from the main body 10 through the communication path 300. Therefore, it is possible to perform power supply control of the operation unit 20 separately from (independently of) power supply control of the main body 10.

Figure 3:
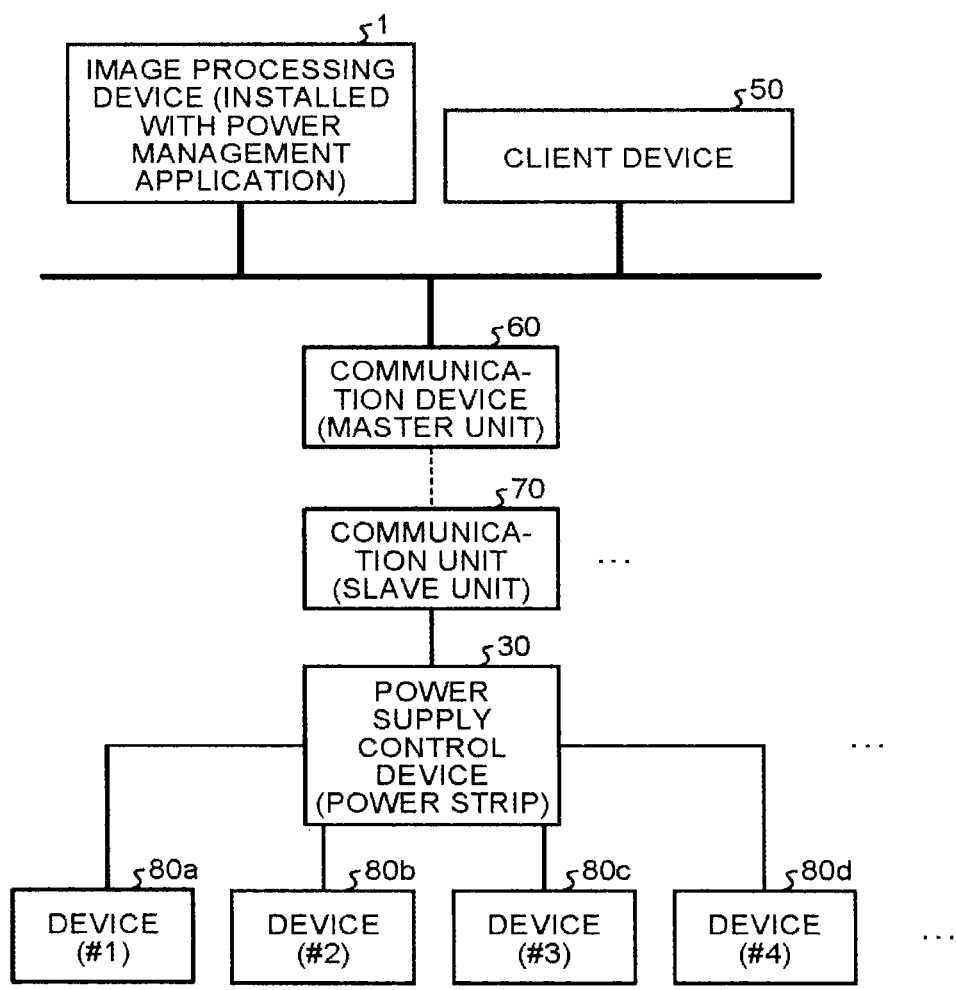
FIG. 3 is a view of a system configuration example of the information processing system.

A system configuration of the information processing system 100 is next described with reference to FIG. 3. FIG. 3 is a view of a system configuration example of the information processing system 100.

As illustrated in FIG. 3, the information processing system 100 includes the image processing device 1, a power supply control device 30, a client device 50, a communication device 60, a communication device 70, and devices 80a to 80d. In the following description, when it is not required to distinguish the devices 80a to 80d from one another, they are simply referred to as "devices 80".

In this example, the image processing device 1 is connected to the client device 50, the communication device 60, and each of the devices 80 through the network such as the LAN. The communication device 60 is a master unit and is connected to a plurality of communication devices 70 being slave units. When a plurality of communication devices 70 is arranged, the number of the power supply control devices 30 and the devices 80 also change depending on the number of the arranged devices.

As described above, the image processing device 1 is an MFP installed with the power management application and controls the power supply of each device 80 through the power supply control device 30 by executing the power management application. The client device 50 may be formed of a PC (personal computer) and the like, for example.

The communication device 60 and the communication device 70 are configured to realize communication between the image processing device 1 and the power supply control device 30 and communication between the client device 50 and the power supply control device 30. The number of the communication devices 70 being the slave units changes depending on the number of the devices 80 power of which is managed; however, if the number of the devices 80 is small, it is not required to provide the communication device 70 being the slave unit.

The power supply control device 30 controls execution or stop of the power supply to the device 80 (on or off of the power supply) under control of the image processing device 1. Although not illustrated in detail, the power supply control device 30 includes a power strip for supplying the power to the device 80. The power strip is connected to a power supply line not illustrated and includes a plurality of outlets (slots) to each of which the device 80 is connected. The power supply control device 30 of this embodiment also has a function to monitor power consumption of the device 80 connected to the outlet of the power strip. The device 80 is supplied with the power from the power supply control device 30 to operate. Meanwhile, the number of the devices 80 included in the information processing system 100 is optional.

Figure 4:
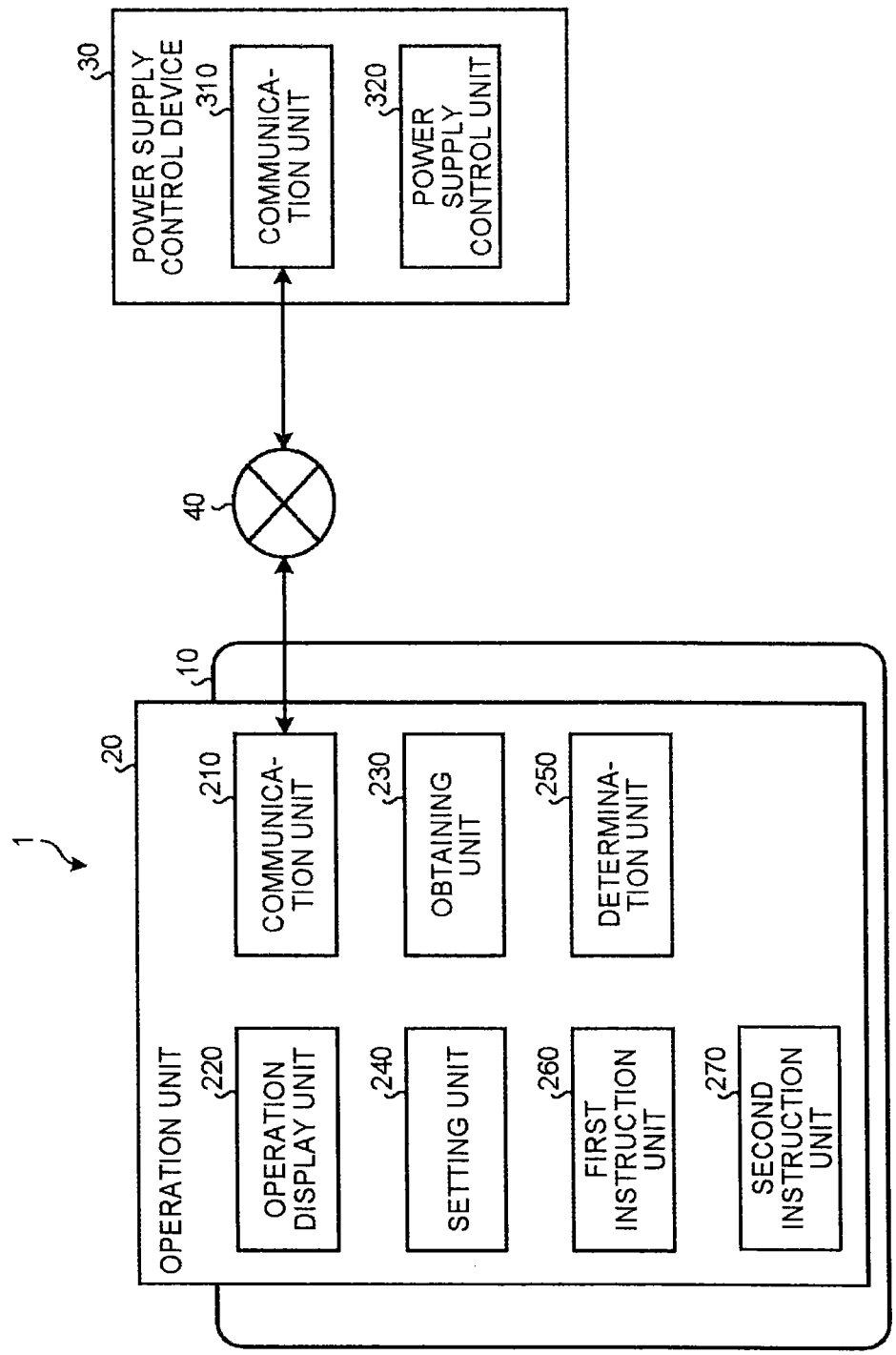
FIG. 4 is a view of an example of a functional configuration of the image processing device and a power supply control device according to a first embodiment.

Next, functions of the image processing device 1 and the power supply control device 30 of this embodiment are described with reference to FIG. 4. FIG. 4 is a block diagram of an example of a functional configuration of the image processing device 1 and the power supply control device 30.

The functional configuration of the image processing device 1 is first described. As illustrated in FIG. 4, the operation unit 20 includes a communication unit 210, an operation display unit 220, an obtaining unit 230, a setting unit 240, a determination unit 250, a first instruction unit 260, and a second instruction unit 270. A part or all of the above-described units may be software (program) or a hardware circuit. A part of the above-described units may also be mounted on the main body 10.

The communication unit 210 communicates with the power supply control device 30 to transmit and receive information for controlling the power supply of each device 80, an energization status, information of a power consumption amount of each device 80 and the like. The communication unit 210 also has a function to communicate with the device 80.

The operation display unit 220 displays various pieces of information and accepts the user operation (operation by a user, sometimes simply referred to as "operation" in the following description). More specifically, the operation display unit 220 performs control to display an image for controlling the power supply of each device 80, an image including the power consumption amount of each device 80 and the like. The operation display unit 220 accepts the user operation regarding the execution or stop of the power supply to each device 80 and the user operation for obtaining the power consumption amount of each device 80. In this example, the operation display unit 220 may be referred to as a receiving unit, a display unit, or a combination of the receiving unit and the display unit. The function of receiving the user operation corresponding to the receiving unit and the function of displaying various pieces of information corresponding to the display unit may be separately provided as different units.

FIG. 5 is a view of a display screen example for giving an instruction to execute or stop the power supply to the device 80. Although a case in which one power supply control device 30 includes a plurality of power strips is herein described as an example, the case is not limited thereto and it is also possible that a plurality of power supply control devices 30 each of which includes one power strip may be provided, for example. In the example in FIG. 5, the power supply control device 30 includes five power strips distinguished as a "power-strip #1", a "power-strip #2", a "power-strip #3", a "power-strip #4", and a "power-strip #5". Each power strip includes four outlets distinguished as an "outlet #1", an "outlet #2", an "outlet #3", and an "outlet 44". Herein, combination of the power strip and the outlet may also be considered as information to specify the device 80 connected to the outlet included in the combination.

As illustrated in FIG. 5, in such a display screen, the energization status of a corresponding device 80 is displayed for each combination of the power strip and the outlet. In the example in FIG. 5, the device 80 corresponding to the combination of the "power-strip #1" and the "outlet #1", that is to say, the device 80 connected to the "outlet #1" of the "power-strip #1" is "executing the power supply (ON)", and the device 80 corresponding to the combination of the "power-strip #3" and the "outlet M#", that is to say, the device 80 connected to the "outlet 41" of the "power-strip #3" "stops the power supply (OFF)". An "obtain newest" button is arranged on the display screen. The "obtain newest" button is a button pressed for updating to a newest energization status. When the "obtain newest" button is pressed by the user operation, the energization status of the power supply control device 30 is obtained by the obtaining unit 230 to be described later and the obtained energization status is displayed.

On the display screen illustrated in FIG. 5, it is also possible to accept the user operation regarding the execution or stop of the power supply to each device 80. For example, when the user presses the image displayed as "ON", the operation display unit 220 accepts an input to give an instruction to stop the power supply to the corresponding device 80 (that is to say, the operation display unit 220 accepts the operation to stop the power supply to the device 80). On the other hand, for example, when the user presses the image displayed as "OFF", the operation display unit 220 accepts an input to give an instruction to execute the power supply to the corresponding device 80 (that is to say, the operation display unit 220 accepts the operation to execute the power supply to the device 80).

The description is continued with reference to FIG. 4 again. The obtaining unit 230 obtains the information of the power consumption of the device 80 through the communication unit 210. More specifically, the obtaining unit 230 obtains the power consumption amount of each device 80 from the power supply control device 30 through the communication unit 210. The obtaining unit 230 obtains the energization status of the power supply of the power supply control device 30. The power consumption amount may be obtained at regular intervals or may be obtained when the user operation for obtaining the power consumption amount is performed in the operation display unit 220. Meanwhile, the obtained power consumption amount is accumulated in a memory or used as information to be displayed on the operation display unit 220.

FIG. 6 is a view of a display screen example of an instantaneous power consumption status. The example in FIG. 6 indicates that the power consumption of the device 80 connected to the "outlet #1" of the "power-strip #1" is "100 W" and the power consumption of the device 80 connected to the "outlet #2" of the "power-strip #1" is "20 N". It is also indicated that the power consumption of the "outlet #1" of the "power-strip #3" and the "outlet #1" of the "power-strip #5" is "0 W" because the power is shut down or the device 80 is not connected thereto. An "obtain newest" button is arranged on the display screen. The "obtain newest" button is a button pressed for updating to a newest power consumption status. When the "obtain newest" button is pressed by the user operation, the obtaining unit 230 obtains the power consumption amount of each electrical device and the obtained power consumption amount is displayed.

Figure 7:
FIG. 7 is a view of an example of association information.

The description is continued with reference to FIG. 4 again. The setting unit 240 holds association information in which pieces of necessity information each indicating necessity of a shutdown process indicating a process required for stopping the power supply to the corresponding device 80 are associated with the devices 80, respectively. In this specification, the shutdown process is defined as the process required for stopping the power supply to the device 80. In this embodiment, the setting unit 240 holds information in which the pieces of necessity information, which may be referred to as association information, of the device 80 connected to the outlet and a method of executing the shutdown process (shutdown method) are associated with each outlet of each power strip. FIG. 7 is a schematic diagram of an example of the association information in which the piece of necessity information of the device 80 connected to the cutlet and the shutdown method are associated with each of the outlets #1 to #5 of the power-strip #1.

The description is continued with reference to FIG. 4 again. The determination unit 250 refers to the association information to determine whether a target device for which the power supply is to be stopped requires the shutdown process when the operation display unit 220 accepts the operation to stop the power supply to any device 80. For example, when the image displayed as "ON" corresponding to the combination of the "power-strip #1" and the "outlet #1" is pressed on the display screen illustrated in FIG. 5, that is to say, when the operation display unit 220 accepts the operation to stop the power supply to the device 80 corresponding to the combination of the "power-strip #1" and the "outlet #1", the determination unit 250 refers to the association information illustrated in FIG. 7 to determine whether the target device (the device 80 corresponding to the combination of the "power-strip #1" and the "outlet #1" in this example) requires the shutdown process. In this case, as illustrated in FIG. 7, the necessity information corresponding to the combination of the "power-strip #1" and the "outlet #1" indicates that the shutdown process is required, so that the determination unit 250 determines that the target device requires the shutdown process.

When the operation display unit 220, which may be referred to as the receiving unit, receives the operation to stop the power supply, the first instruction unit 260 instructs the target device to perform the shutdown process when the target device the power supply to which is stopped requires the shutdown process based on the association information. More specifically, when the determination unit 250 determines that the target device requires the shutdown process, the first instruction unit 260 performs control to transmit a command to instruct to perform the shutdown process to the target device through the communication unit 210.

The second instruction unit 270 instructs the power supply control device 30 which controls the execution or stop of the power supply (on or off of the power supply) to the device 80 to stop the power supply to the target device when the shutdown process of the target device instructed to perform the shutdown process is completed. In this example, when the device 80 which accepts the command to instruct to perform the shutdown process completes the shutdown process, this transmits completion notification indicating that the shutdown process is completed to the image processing device 1 (operation unit 20 in this example). When the second instruction unit 270 receives the completion notification from the target device through the communication unit 210, this determines that the shutdown process of the target device is completed and performs control to transmit a command to instruct to stop the power supply to the target device to the power supply control device 30 through the communication unit 210.

Meanwhile, when the above-described determination unit 250 determines that the target device does not require the shutdown process, the first instruction unit 260 does not instruct the target device to perform the shutdown process. The second instruction unit 270 performs the control to transmit the command to instruct to stop the power supply to the target device to the power supply control device 30 through the communication unit 210 without waiting for reception of the completion notification. Meanwhile, when the above-described determination unit 250 determines that the target device does not require the shutdown process, a subject which instructs the power supply control device 30 to stop the power supply to the target device is not limited to the second instruction unit 270 and this may also be the first instruction unit 260, for example; it is also possible that a function to perform the control to transmit the command to instruct to stop the power supply to the target device to the power supply control device 30 through the communication unit 210 is provided separately from the first and second instruction units 260 and 270.

The functional configuration of the power supply control device 30 is next described. As illustrated in FIG. 4, the power supply control device 30 includes a communication unit 310 and a power supply control unit 320. The communication unit 310 communicates with the image processing device 1 connected to the network 40. More specifically, the communication unit 310 communicates with the image processing device 1 to transmit and receive the information of the power consumption amount of each device 80, the energization status, the information for controlling the power supply of each device 80 and the like. As described above, the information of the power consumption amount of each device 80 and the energization status are transmitted at regular intervals or transmitted upon request. The power supply control unit 320 controls the execution or stop of the power supply to the device 80. More specifically, the power supply control unit 320 controls the execution or stop of the power supply to the corresponding outlet when accepting the instruction regarding the execution or stop of the power supply from the image processing device 1 through the communication unit 310.

Figure 8:
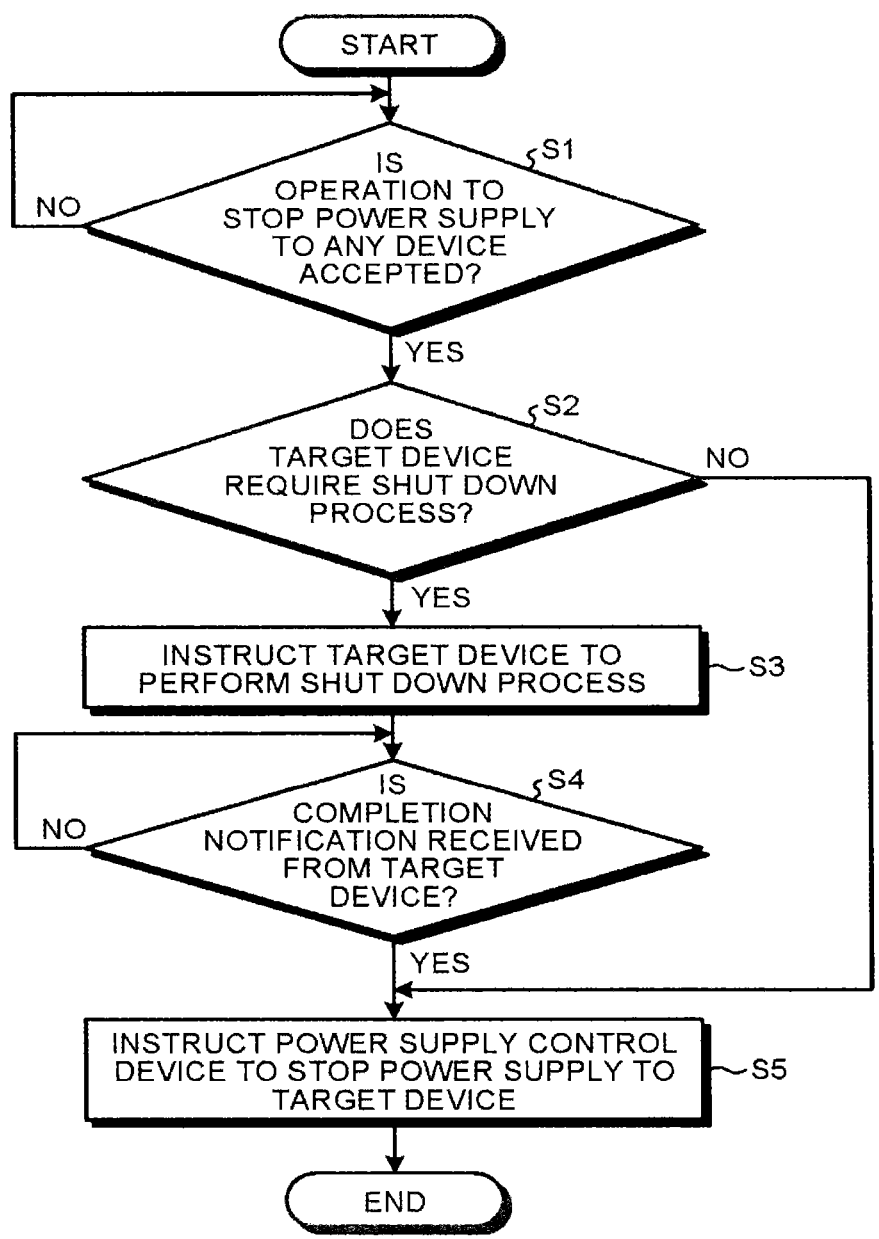
FIG. 8 is a flowchart of an operation example of the image processing device according to the first embodiment.

Next, an operation example of the image processing device 1 installed with the above-described power management application is described with reference to FIG. 8. FIG. 8 is a flowchart of the operation example of the image processing device 1 installed with the above-described power management application. First, the operation display unit 220 determines whether this accepts the operation to stop the power supply to any device 80 (step S1). When accepting the operation to stop the power supply to any device 80 (step S1: YES), the determination unit 250 refers to the association information to determine whether the target device the power supply to which is stopped requires the shutdown process (step S2).

When it is determined that the target device requires the shutdown process (step S2: YES), the first instruction unit 260 instructs the target device to perform the shutdown process (step S3). Then, the second instruction unit 270 waits for the completion notification from the target device (step S4). When receiving the completion notification from the target device (step S4: YES), the second instruction unit 270 instructs the power supply control device 30 to stop the power supply to the target device (step S5). On the other hand, when it is determined that the target device does not require the shutdown process at step S2 described above (step S2: NO), the process shifts to step S5.

As described above, in this embodiment, when accepting the operation to stop the power supply to the device which requires the shutdown process is accepted, the power supply to the device is stopped after the shutdown process of the device is completed, so that an advantageous effect to prevent failure of the device may be realized as compared to a configuration in which the power supply is immediately stopped without the shutdown process.

Second Embodiment

A second embodiment is next described. In the second embodiment, a target device does not have a function to transmit completion notification indicating that a shutdown process is completed to an image processing device 1 even when this accepts a command to instruct to perform the shutdown process, so that a second instruction unit 270 determines whether the shutdown process of the target device is completed based on a power state of the target device. This is hereinafter specifically described. Meanwhile, description of a part overlapped with that of the above-described first embodiment is appropriately omitted.

Figure 9:
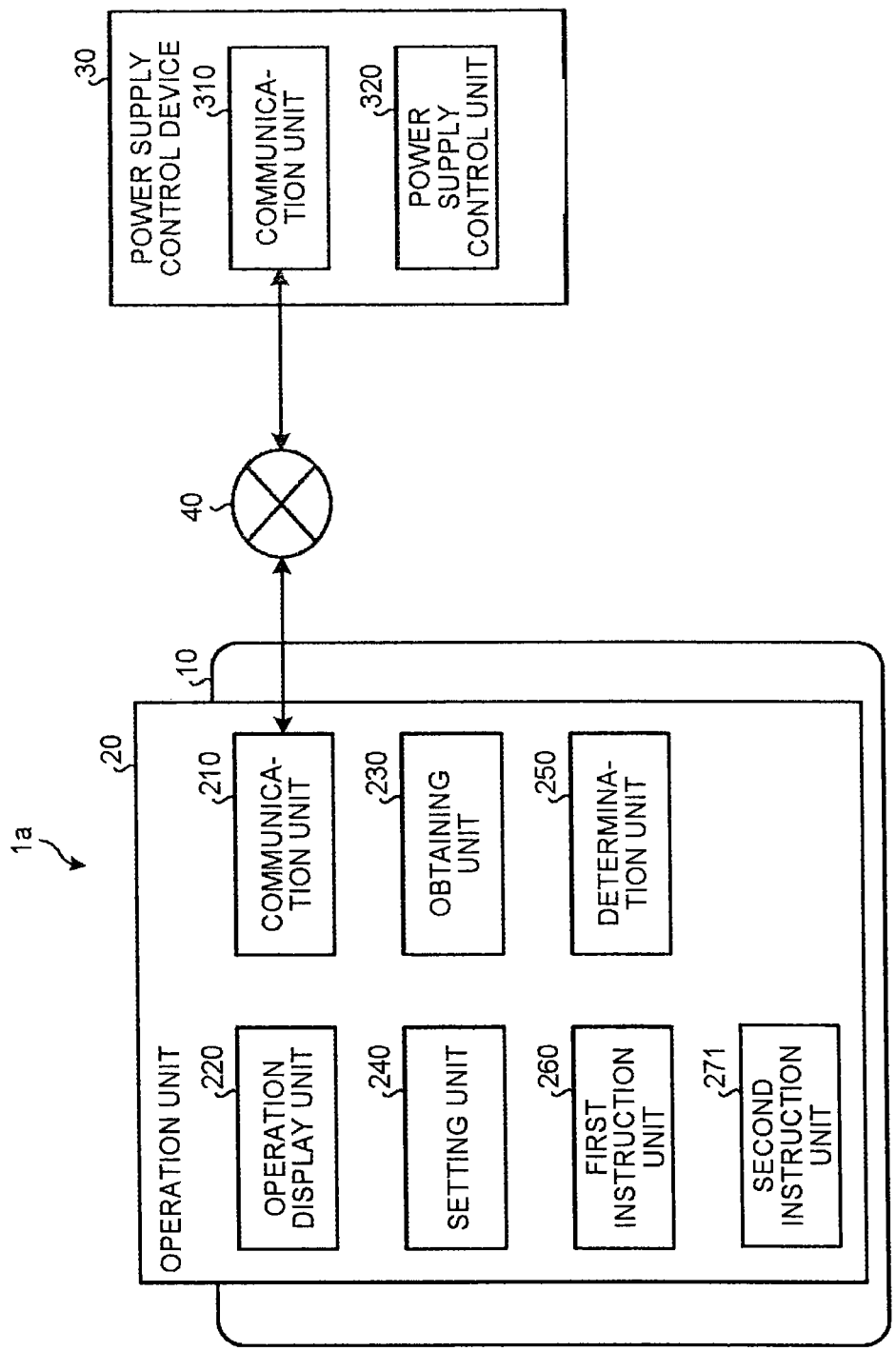
FIG. 9 is a view of an example of a functional configuration of an image processing device and a power supply control device according to a second embodiment.

FIG. 9 is a block diagram of an example of a functional configuration of an image processing device 1a and a power supply control device 30 according to the second embodiment. As illustrated in FIG. 9, the image processing device 1a includes a communication unit 210, an operation display unit 220, an obtaining unit 230, a setting unit 240, a determination unit 250, a first instruction unit 260, and a second instruction unit 271. Functions other than that of the second instruction unit 271 are similar to those of the first embodiment.

The second instruction unit 271 determines whether the shutdown process of the target device is completed based on the power state of the target device. More specifically, the second instruction unit 271 determines that the shutdown process of the target device is completed when power consumption of the target device is not larger than a first threshold and a change rate of the power consumption of the target device is not larger than a second threshold. That is to say, the second instruction unit 271 determines that the shutdown process is completed when power of the target device is lowered and stable. Meanwhile, each value of the first and second thresholds may be optionally set. In short, the first and second thresholds may be values used when determining whether the power of the target device is lowered and stable.

The second instruction unit 271 of this embodiment instructs the obtaining unit 230 to obtain information of the power consumption of the target device at predetermined intervals after the command to instruct to perform the shutdown process is transmitted by the first instruction unit 260 to the target device. It is determined whether the power consumption of the target device is not larger than the first threshold and the change rate of the power consumption of the target device is not larger than the second threshold from the information of the power consumption obtained by the obtaining unit 230, and it is determined that the shutdown process is completed when a determination result is positive.

Figure 10:
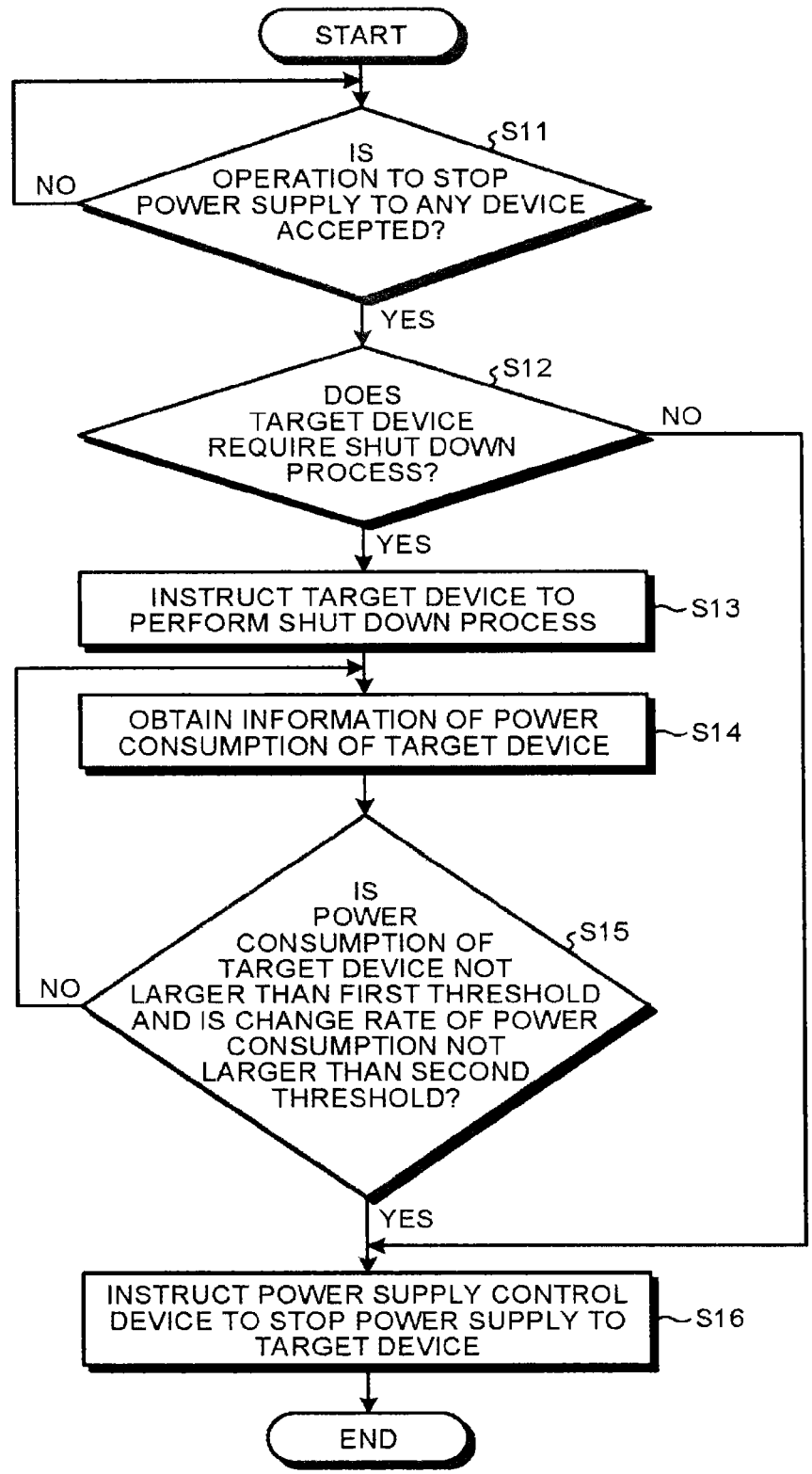
FIG. 10 is a flowchart of an operation example of the image processing device according to the second embodiment.

FIG. 10 is a flowchart of an operation example of the image processing device 1a of the second embodiment. Contents at steps S11 to S13 illustrated in FIG. 10 are similar to the contents at steps S1 to S3 illustrated in FIG. 8. Contents at step S16 illustrated in FIG. 10 are similar to the contents at steps S5 illustrated in FIG. 9. After step S13, the second instruction unit 271 instructs the obtaining unit 230 to obtain the information of the power consumption of the target device at predetermined intervals. The obtaining unit 230 which receives this instruction obtains the information of the power consumption of the target device from the power supply control device 30 (step S14). The second instruction unit 271 determines whether the power consumption of the target device is not larger than the first threshold and the change rate of the power consumption of the target device is not larger than the second threshold from the information of the power consumption obtained by the obtaining unit 230 (step S15).

When it is determined that the power consumption of the target device is not larger than the first threshold and that the change rate of the power consumption of the target device is not larger than the second threshold at step S15 described above (step S15: YES), the process shifts to stop S16. On the other hand, when it is determined that a condition that the power consumption of the target device is not larger than the first threshold and that the change rate of the power consumption of the target device is not larger than the second threshold is not satisfied (step S15: NO), the processes after step S14 described above are repeated.

Third Embodiment

A third embodiment is next described. In the third embodiment, control to display information indicating whether a device 80 requires a shutdown process or information indicating that the device is executing the shutdown process is performed.

Figures 11, 12:
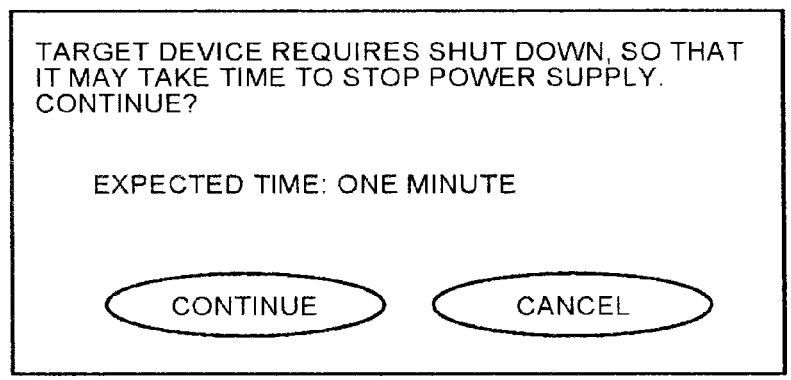
FIG. 11 is a view of an example of a display screen of a third embodiment.
FIG. 12 is a view of an example of the display screen of the third embodiment.

For example, as illustrated in FIG. 11, an operation display unit 220 may perform control to display information indicating that the device 80 corresponding to combination of a "power-strip #2" and an "outlet #2" requires the shutdown process, so that this takes time to stop power supply (in an example in FIG. 11, color information for distinguishing from the device 80 which does not require the shutdown process) on a display screen for giving an instruction to execute or stop the power supply described above. As illustrated in FIG. 11, for example, the operation display unit 220 may perform control to display information indicating that the device 80 corresponding to combination of a "power-strip #3" and an "cutlet #2" is executing the shutdown process (in the example in FIG. 11, information "now shutdown") on the display screen for giving an instruction to execute or stop the power supply described above.

For example, when the user presses an image displayed as "ON" on the display screen illustrated in FIG. 5 and when the corresponding device 80 requires the shutdown process, the operation display unit 220 may also perform control to display a screen illustrated in FIG. 12.

For example, it is also possible that the above-described operation display unit 220, setting unit 240, determination unit 250, first instruction unit 260, and second instruction unit 270 (271) are mounted in a dispersed manner on the image processing device 1 (1a) and the power supply control device 30. For example, it is also possible that the above-described operation display unit 220, setting unit 240, determination unit 250, first instruction unit 260, and second instruction unit 270 (271) are mounted in a dispersed manner on the image processing device 1 (1a), the power supply control device 30, and one or more external devices (for example, server devices).

In short, the information processing system to which the present invention is applied may be at least provided with a function corresponding to the above-described operation display unit 220, a function corresponding to the above-described setting unit 240, a function corresponding to the above-described first instruction unit 260, and a function corresponding to the above-described second instruction unit 270. The information processing device to which the present invention is applied may be one device at least provided with the function corresponding to the above-described operation display unit 220, the function corresponding to the above-described setting unit 240, the function corresponding to the above-described first instruction unit 260, and the function corresponding to the above-described second instruction unit 270. In the above-described embodiment, the operation unit 20 may be referred to as an "information processing device", and the image processing device 1 also to as an "information processing device".

Although the main body 10 and the operation unit 20 are operated independently of each other by the different operating systems in the above-described embodiments, there is no limitation and the main body 10 and the operation unit 20 may be operated by the same operating system, for example.

The program executed by the information processing system of the above-described embodiments may be configured to be stored in a computer readable storage medium such as a CD-ROM, a flexible disk (FD), a CD-R, a DVD (digital versatile disk), and a USB (universal serial bus) as a file in an installable format or an executable format to be provided or may be configured to be provided or distributed through a network such as the Internet. The various programs may be configured to be provided as being incorporated in a ROM and the like in advance.

According to the embodiments, it is possible to prevent the immediate stop of the power supply without performing the shutdown process when the power supply to the device which requires the shutdown process is stopped.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing system comprising:
   circuitry configured to
   receive user operation;
   hold association information including, for each of plural devices, necessity information indicating necessity of a shutdown process required for stopping power supply to a corresponding device;
   for a target device for which the power supply is to be stopped based on the received user operation, determine whether the target device requires the shutdown process based on the association information;
   transmit, to the target device for which the power supply is to be stopped, a command to perform the shutdown process when the target device requires the shutdown process based on the association information; and
   transmit, to a power supply control device that controls the power supply to the target device, to stop the power supply to the target device when the shutdown process of the target device is completed; and
   an image processing device including a main body and an operation interface, the main body including at least a plotter and a scanner, the operation interface being configured to operate the main body and control a power supply of another device through a power supply control device, wherein
   information display and power supply control of the other device is performed by using the operation interface, and
   a transceiver of the operation interface directly communicates with the power supply control device without using the main body to receive and transmit information on a power state of the other device and power supply control.

2. The information processing system according to claim 1, wherein the circuitry determines that the shutdown process of the target device is completed when receiving completion notification indicating that the shutdown process is completed from the target device.

3. The information processing system according to claim 1, wherein the circuitry determines whether the shutdown process of the target device is completed based on a power state of the target device.

4. The information processing system according to claim 3, wherein the circuitry determines that the shutdown process of the target device is completed when power consumption of the target device is not larger than a first threshold and a change rate of the power consumption of the target device is not larger than a second threshold.

5. The information processing system according to claim 1, further comprising a display that performs control to display information indicating whether the device requires the shutdown process or information indicating that the device is executing the shutdown process.

6. An information processing device comprising:
   circuitry configured to
   receive user operation;
   hold association information including, for each of plural devices, necessity information indicating necessity of a shutdown process required for stopping power supply to a corresponding device;
   for a target device for which the power supply is to be stopped based on the received user operation, determine whether the target device requires the shutdown process based on the association information;
   transmit, to a target device for which the power supply is to be stopped, a command to perform the shutdown process when the target device requires the shutdown process based on the association information; and
   transmit, to a power supply control device that controls the power supply to the target device, to stop the power supply to the target device when the shutdown process of the target device is completed; and
   an image processing device including a main body and an operation interface, the main body including at least a plotter and a scanner, the operation interface being configured to operate the main body and control a power supply of another device through a power supply control device, wherein
   information display and power supply control of the other device is performed by using the operation interface, and
   a transceiver of the operation interface directly communicates with the power supply control device without using the main body to receive and transmit information on a power state of the other device and power supply control.

7. An information processing method to be performed by an information processing device, the method comprising:
   receiving user operation;
   for a target device for which power supply is to be stopped based on the received user operation, determining whether the target device requires a shutdown process based on association information including, for each of plural devices, necessity information indicating necessity of the shutdown process required for stopping the power supply to a corresponding device;
   transmitting, to the target device for which power supply is to be stopped, a command to perform the shutdown process when the target device requires the shutdown process based on the association information; and
   transmitting, to a power supply control device that controls the power supply to the target device, to stop the power supply to the target device when the shutdown process of the target device is complete, wherein
   the information processing device includes an image processing device including a main body and an operation interface, the main body including at least a plotter and a scanner, the operation interface being configured to operate the main body and control a power supply of another device through a power supply control device,
   information display and power supply control of the other device is performed by using the operation interface, and
   a transceiver of the operation interface directly communicates with the power supply control device without using the main body to receive and transmit information on a power state of the other device and power supply control.

* * * * *